H. Fisher.

Hook,

N° 85,169.    Patented Dec. 22, 1868.

Witnesses:
Sarah Noyes.
Frederic Thomas

Inventor,
Henry Fisher by
J. N. Beadle Atty.

United States Patent Office.

HENRY FISHER, OF AURORA, INDIANA.

*Letters Patent No. 85,169, dated December 22, 1868.*

IMPROVED SELF-GUARDING HOOK.

The Schedule referred to in these Letters Patent and making part of the same.

*To all whom it may concern:*

Be it known that I, HENRY FISHER, of Aurora, in the county of Dearborn, and State of Indiana, have invented a new and useful Self-Guarding Hook; and I do hereby declare that the following is a full and exact description of the same, reference being had to the accompanying drawings, and to the letters of reference marked thereon.

This invention consists of a double hook, of peculiar construction, which is intended for use as a clothes-pole or cistern-pole hook, being, from its peculiar construction, self-guarding, so that the line or bucket can in no way become detached, excepting by design, as will be fully described hereinafter.

Figure 1:
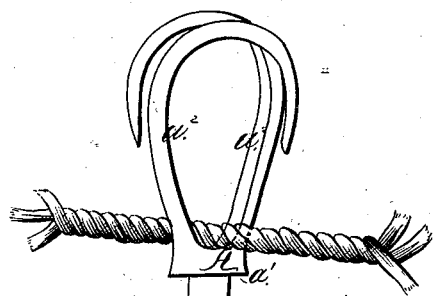
Figure 2:

Figure 1 represents a view of my improved hook as used for holding clothes-lines, and Figure 2, a view as used for the ordinary purposes of a hook.

In the drawings, A represents the shank, which is provided with the tapering screw-thread $a$ and shoulder $a^1$.

$a^2 \, a^2$, fig. 2, represent hooks, extending downward from the shoulder $a^1$, as shown.

The upward turn of each hook is in line with the downward turn of its fellow, so that the points are guarded thereby, as shown.

The hooks are attached to the shoulder in line with each other, but, descending from that point, twist in opposite directions, so that, at their lowest points, they are separated a little distance apart.

The operation of my invention is as follows:

When attached to a clothes-pole, for the purpose of supporting the line, the hooks $a^2 \, a^2$ should be thrust up by the line (which passes in between them) until the points of the hooks are passed. By now giving the pole a half turn, the line will be caught, and securely held.

When used for a cistern, the hook is used in a reversed position, but the operation is essentially the same. When hung in this way, the bucket cannot be detached, excepting by design.

By the construction herein described, a simple but reliable self-guarding hook is produced. It may be constructed of any suitable metal, and of any desired size, and it may be used for any purpose for which ordinary hooks are used.

Having thus fully described my invention,

What I claim as new, and desire to secure by Letters Patent, is—

The double hook, A $a \, a^1 \, a^2 \, a^2$, constructed and arranged substantially as and for the purpose described.

This specification signed and witnessed, this 3d day of June, 1868.

HENRY FISHER.

Witnesses:
JNO. A. CONNELL,
S. S. SCOTT.